US011354145B2

(12) United States Patent
Babol et al.

(10) Patent No.: US 11,354,145 B2
(45) Date of Patent: Jun. 7, 2022

(54) CREATING PROCESS FINGERPRINTS BASED ON VIRTUALIZED CONTAINERS FOR DETERMINING SOFTWARE PRODUCT USAGE

(71) Applicant: International Business Machines Corporation, Armonk, NY (US)

(72) Inventors: Adam Babol, Lubartow (PL); Jacek Midura, Zabierzów (PL); Jan Galda, Cracow (PL); Lukasz T. Jeda, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/553,700

(22) Filed: Aug. 28, 2019

(65) Prior Publication Data
US 2021/0064400 A1  Mar. 4, 2021

(51) Int. Cl.
| G06F 9/455 | (2018.01) |
| G06F 9/445 | (2018.01) |
| G06F 21/53 | (2013.01) |
| G06F 9/48 | (2006.01) |
| G06F 7/02 | (2006.01) |
| G06F 21/57 | (2013.01) |

(52) U.S. Cl.
CPC ............ *G06F 9/45508* (2013.01); *G06F 7/02* (2013.01); *G06F 9/445* (2013.01); *G06F 21/53* (2013.01); *G06F 9/4843* (2013.01); *G06F 21/57* (2013.01)

(58) Field of Classification Search
CPC ............ G06F 8/60; G06F 2009/45591; G06F 9/45558; G06F 8/65; G06F 9/545; G06F 21/57; G06F 2209/542; G06F 21/53
See application file for complete search history.

(56) References Cited

U.S. PATENT DOCUMENTS

| 7,885,975 | B2 * | 2/2011 | Faden | ................. G06F 21/6236 |
| | | | | 707/786 |
| 8,650,579 | B1 * | 2/2014 | Herington | ................. G06F 8/65 |
| | | | | 719/313 |
| 9,547,656 | B2 * | 1/2017 | Aleshire | ................. G06F 16/13 |
| 9,612,815 | B1 * | 4/2017 | Jagtap | ....................... G06F 8/61 |
| 9,665,366 | B2 * | 5/2017 | Kuchibhotla | ............. G06F 8/65 |
| 10,348,767 | B1 * | 7/2019 | Lee | ..................... H04L 63/1416 |
| 10,484,419 | B1 * | 11/2019 | Davis | .................... G06F 21/577 |
| 10,956,143 | B2 * | 3/2021 | Shivanna | ................. G06F 8/65 |

(Continued)

FOREIGN PATENT DOCUMENTS

WO    2018/217368 A1    11/2018

*Primary Examiner* — Lewis A Bullock, Jr.
*Assistant Examiner* — Gilles R Kepnang
(74) *Attorney, Agent, or Firm* — Edell, Shapiro & Finnan, LLC

(57) ABSTRACT

A method, a system, and a computer program product are provided for determining usage of a software product. The software product is initialized within a virtualized container. Processes executing within the virtualized container are identified. A process fingerprint for the software product is created and includes identifying information of the processes executing within the virtualized container. Usage of the software product on a computing device is determined based, at least partly, on the identifying information of only non-common processes included in the process fingerprint.

12 Claims, 6 Drawing Sheets

(56) References Cited

U.S. PATENT DOCUMENTS

| | | | |
|---|---|---|---|
| 2013/0347064 A1* | 12/2013 | Aissi | G06F 21/53 726/2 |
| 2015/0150003 A1* | 5/2015 | Emelyanov | G06F 9/455 718/1 |
| 2015/0161618 A1* | 6/2015 | Angus | G06Q 30/018 705/317 |
| 2017/0054746 A1* | 2/2017 | Sreekanti | H04L 63/1425 |
| 2017/0180399 A1* | 6/2017 | Sukhomlinov | G06F 9/45558 |
| 2017/0351861 A1* | 12/2017 | El-Moussa | G06F 21/566 |
| 2018/0191782 A1* | 7/2018 | Djordjevic | G06F 9/45558 |
| 2018/0218149 A1* | 8/2018 | Jacobs | G06F 21/52 |
| 2018/0246812 A1 | 8/2018 | Aronovich et al. | |
| 2018/0276020 A1 | 9/2018 | Kimura | |
| 2018/0336113 A1 | 11/2018 | Asawa et al. | |
| 2019/0243688 A1* | 8/2019 | Karmarkar | G06F 9/5011 |
| 2019/0319977 A1* | 10/2019 | Gottschlich | G06K 9/6256 |
| 2020/0394300 A1* | 12/2020 | Harris | G06F 21/575 |

* cited by examiner

CREATING PROCESS FINGERPRINTS BASED ON VIRTUALIZED CONTAINERS FOR DETERMINING SOFTWARE PRODUCT USAGE

BACKGROUND

1. Technical Field

Present invention embodiments relate to creating of one or more process fingerprints, each of which includes process identifying information of multiple processes associated with a respective software product, and determining usage of one or more of the respective software products based on the process identifying information included in each of the one or more process fingerprints.

2. Discussion of the Related Art

Many businesses use software products such as, for example, word processing applications, accounting applications, business intelligence applications, as well as other software products. The businesses pay licensing fees for those software products that require such a fee. As time passes, the businesses may begin using some new software products, for which new licensing fees may be incurred, and may stop using some of their licensed software products. Because many licensed software products require a recurring payment of a licensing fee, the businesses desire to pay licensing fees only for those software products that are actually being used.

Numerous methods can be used to discover whether a particular software product is executing on a computing device. One of these methods includes executing the particular software product on a computing device and obtaining a list of running processes on the computing device while the particular software product is executing. For example, if the list of running processes on the computing device executing the particular software product includes processes proc1 and proc2, then one may conclude that a different computing device that includes processes proc1 and proc2 in a list of processes executing on that different computing device is executing the particular software product. However, creating a list of processes associated with a particular software product includes setting up of a complete infrastructure for executing the software product, which can be expensive. Further, a list of processes running on a computing device executing the software product also includes processes associated with an operating system as well as processes associated with any other applications running on the computing device. Therefore, determining which of the processes running on that computing device are associated with the particular software product may be difficult.

SUMMARY

In a first aspect of various embodiments, a computer-implemented method is provided for determining usage of a software product. The software product is initialized within a virtualized container. Processes executing within the virtualized container are identified and a process fingerprint for the software product is created. The created process fingerprint includes identifying information of the processes executing within the virtualized container. Usage of the software product on a computing device is determined based, at least partly, on the identifying information of only non-common processes included in the process fingerprint.

In a second aspect of the various embodiments, a system is provided for determining usage of a software product. The system includes at least one processor and at least one memory. Each of the at least one memory is connected to a processor of the at least one processor. One or more of the at least one processor is configured to perform a number of steps. According to the steps, the software product is initialized within a virtualized container. Processes executing within the virtualized container are identified and the process fingerprint for the software product is created and includes identifying information of the processes executing within the virtualized container. Usage of the software product is determined based, at least partly, on the identifying information of only non-common processes included in the process fingerprint.

In a third aspect of the various embodiments, a computer program product is provided for determining usage of a software product. The computer program product includes at least one computer readable storage medium having computer readable program code embodied therewith for execution on one or more processors. The computer readable program code is configured to be executed by the one or more processors to perform a number of steps. According to the steps, the software product is initialized within a virtualized container. Processes executing within the virtualized container are identified. The process fingerprint for the software product is created and includes identifying information of the processes executing within the virtualized container. Usage of the software product on a computing device is determined based, at least partly, on the identifying information of only non-common processes included in the process fingerprint.

BRIEF DESCRIPTION OF THE DRAWINGS

Generally, like reference numerals in the various figures are utilized to designate like components.

DETAILED DESCRIPTION

A method, a system, and a computer program product are provided for creating a process fingerprint and determining usage of a software product on a computing device based on the process fingerprint. An isolated, system-level virtualized container may be generated and initialized to execute a software product. All processes executing within the isolated, system-level virtualized container then may be identified. Because the isolated, system-level virtualized container is executing only the software product, each of the identified processes is associated with the software product. The process fingerprint for the software product then may be created and identifying information regarding all of the processes executing within the isolated, system-level virtualized container may be included in the process fingerprint for the software product. Whether the software product is being used, or executed, may be determined based, at least partly, on the identifying information included in the process fingerprint. When the software product is determined as being used, a notification may be provided to a user.

Figure 1:
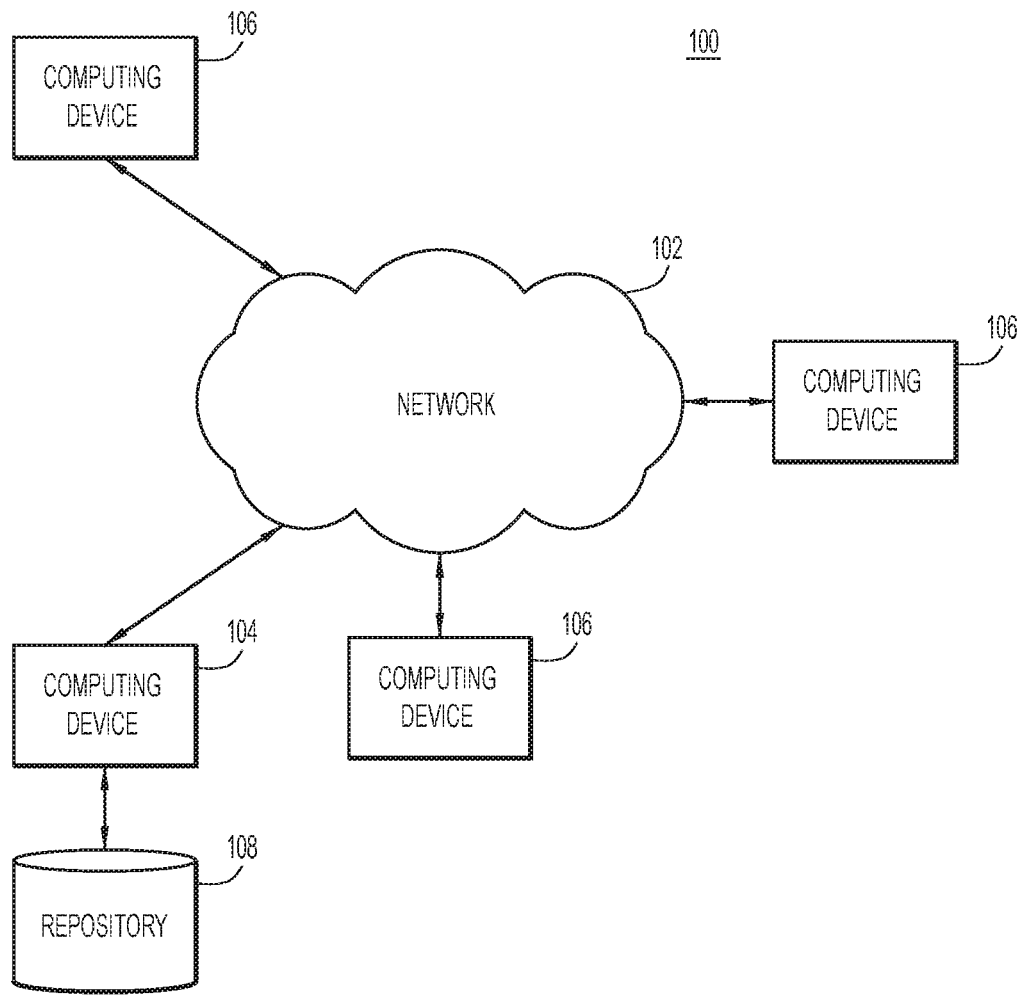
FIG. 1 illustrates an example environment in which various embodiments may operate.

FIG. 1 illustrates an example environment 100 in which the present invention embodiments may operate. Environment 100 may include a network 102, a computing device 104, which may include a server, and computing devices 106. Each of computing devices 104, 106 may be connected to network 102 via a wired or wireless connection. Further, computing device 104 may have access to a data repository 108, which in some embodiments may include a database such as a relational database or other type of database.

Network 102 may be implemented by any number of any suitable communications media (e.g., wide area network (WAN), local area network (LAN), Internet, Intranet, etc.) or any combination thereof.

Computing devices 104, 106 may communicate with each other via network 102. In this specification, a reference to computing device 104 can be interpreted as referring to either a single computing device or multiple clustered computing devices. In some embodiments, computing device 104 may include a single server or multiple servers configured as a server farm.

Computing devices 104, 106 may be implemented by any conventional or other computer system.

In some embodiments, repository 108 may be accessible via computing device 104. Alternatively, repository 108 may be accessible from any of computing devices 104, 106 via network 102 and a file server (not shown) connected to network 102 and repository 108.

Although environment 100 of FIG. 1 shows one computing device 104, three computing devices 106, and one repository 108, other environments may include different numbers of computing devices 104, 106 and repositories 108.

Figure 2:
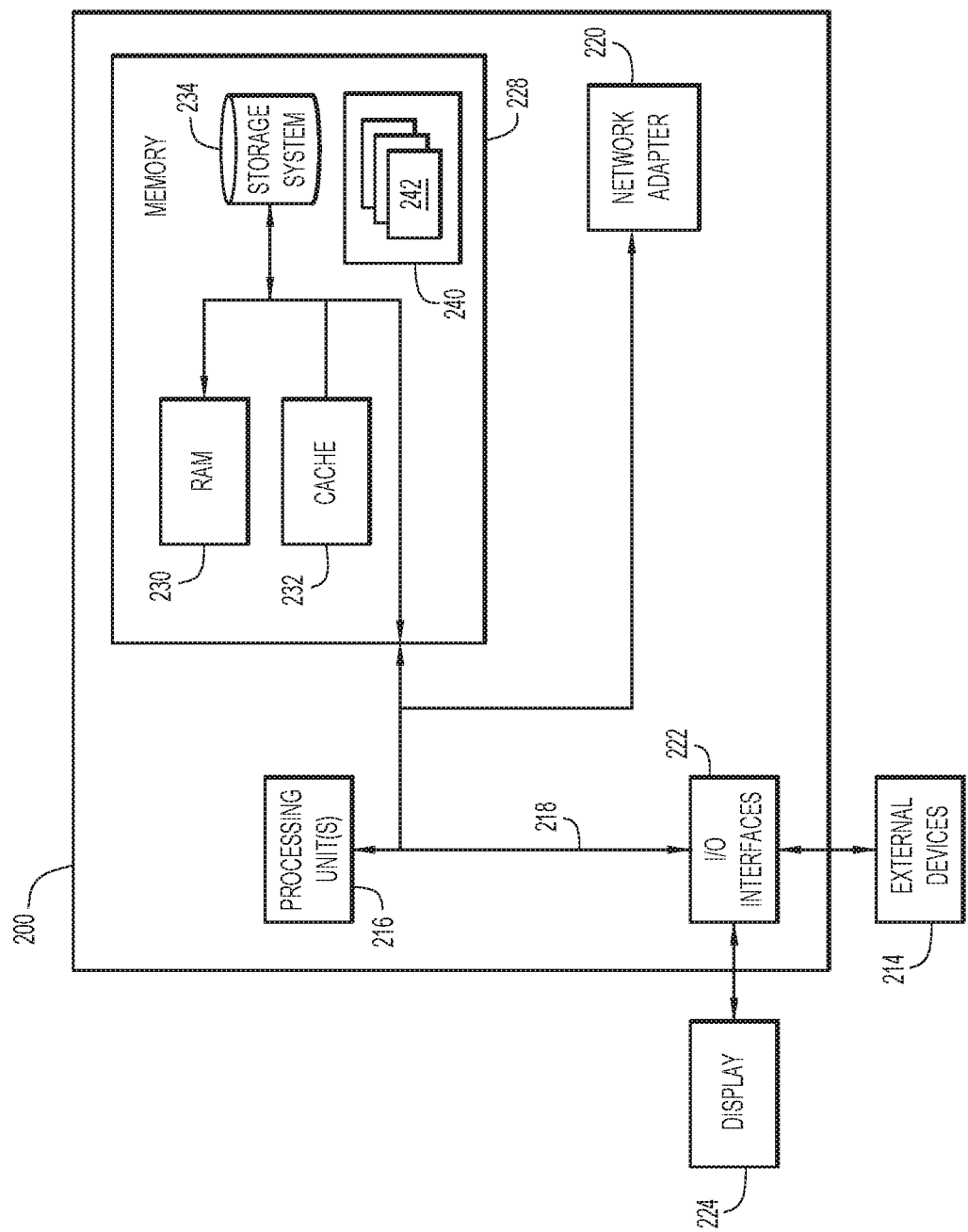
FIG. 2 is a functional block diagram of a general purpose computer that may implement various embodiments.

Referring now to FIG. 2, a schematic of an example computer system 200 is shown, which may implement any of computing devices 104, 106 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
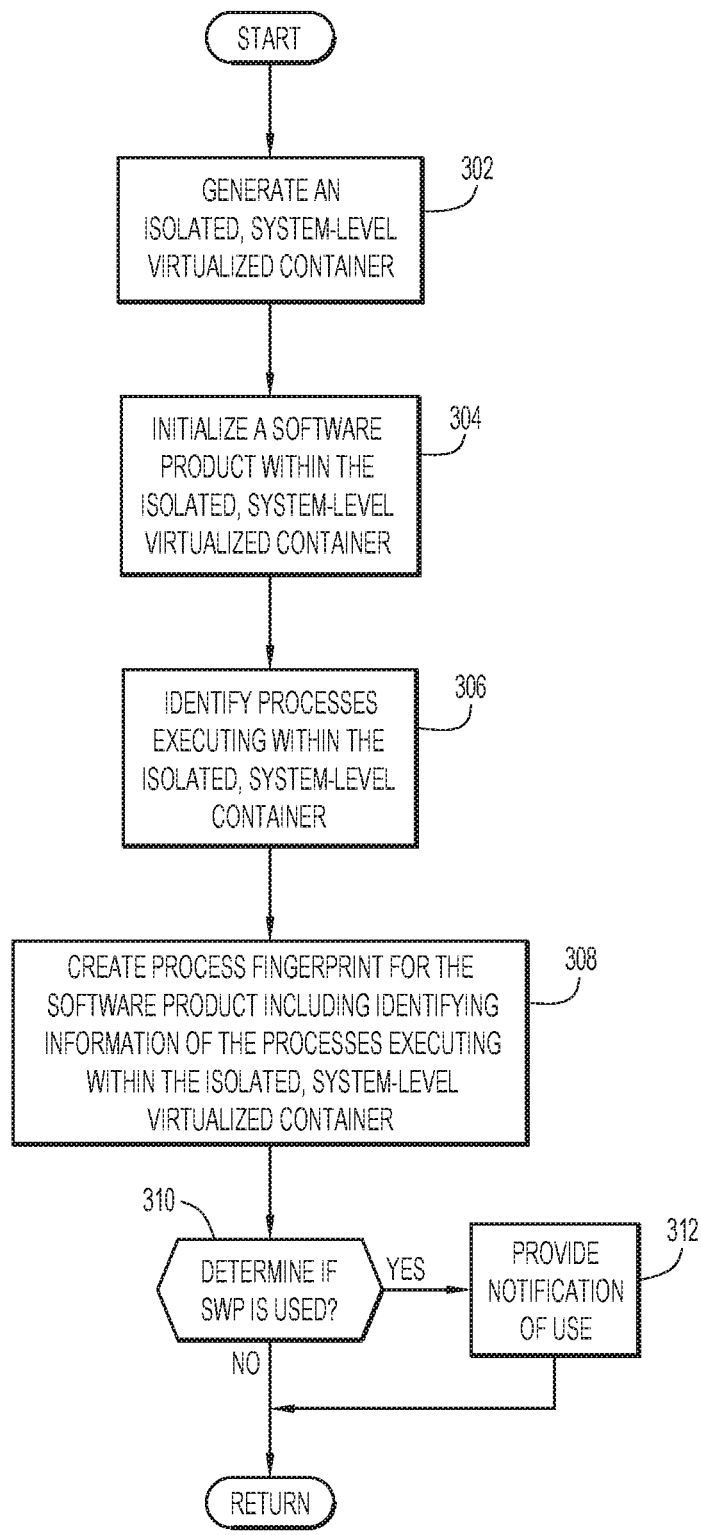
FIG. 3 is a flowchart of an example process for creating a process fingerprint for a software product and determining whether the software product is being used according to various embodiments.

FIG. 3 is a flowchart illustrating an example process that may be performed by a computing device such as, for example, computing device 104, according to various embodiments. The process may begin with computing device 104 generating an isolated, system-level virtualized or other container (act 302) and initializing a software product within the isolated, system-level virtualized container (act 304). In some embodiments, the isolated, system-level virtualized container may be generated and initialized by Docker® (Docker is a registered trademark of Docker, Inc., a Delaware corporation). Docker® is an open source software development platform designed to facilitate creation, deployment, and execution of applications by using containers. In other embodiments, the isolated, system-level virtualized container may be generated by using another software development platform or other methods.

Next, computing device 104 may identify all processes executing within the isolated, system-level virtualized container (act 306). Because only processes associated with the software product would be executing within the isolated, system-level virtualized container, each of the identified processes are associated with the software product. Computing device 104 then may create a process fingerprint for the software product, which includes identifying information of each of the processes executing within the isolated, system-level virtualized container (act 308).

Computing device 104 may determine if the software product is being used by comparing the identifying information, included in the created process fingerprint, with identifying information of the processes executing on a computing device (act 310).

In various embodiments, identifying information regarding one or more common processes such as, for example, cmd.exe or other common processes, may be ignored during the comparing. In some embodiments, whether a process is a common process may be determined by comparing the process with a predefined list of common processes. Thus, for example, if the identifying information included in the process fingerprint includes information regarding one or more common processes and the identifying information of the processes executing on the computing device does not include identifying information corresponding to the one or more common processes, but does include identifying information corresponding to all non-common processes having identifying information in the process fingerprint, then the computing device is determined as using the software product.

Alternatively, instead of ignoring the one or more common processes during the comparing, during act 308 identifying information of the one or more common processes may not be included in the created process fingerprint for the software product and only identifying information of non-common processes may be included in the created process fingerprint.

If the software product is determined as being used, then computing device 104 may provide a notification that the software product is being used (act 312). The notification may be provided by displaying a message on a display screen, sending an email to a particular user, sending a text message to a particular user, sending a voicemail message to a particular user, announcing the notification via a speaker, or via other methods. In addition to providing the notification, other actions may be performed including, but not limited to, uninstalling/removing the software product, stopping licensing of the software product, and updating the software product.

Although the example process illustrated by the flowchart of FIG. 3 does not provide a notification when the software product is determined as not being used, in other embodiments, such a notification may be provided using any of the methods previously described with respect to the notification of use of the software product or via other methods.

Further, in some embodiments, a computing device may request identifying information of processes executing on that computing device or on a remote computing device, and after receiving the requested identifying information, may compare the received identifying information with the identifying information included in the process fingerprint, as discussed above, to determine whether that computing device or the remote computing device is using the software product.

Figure 4:
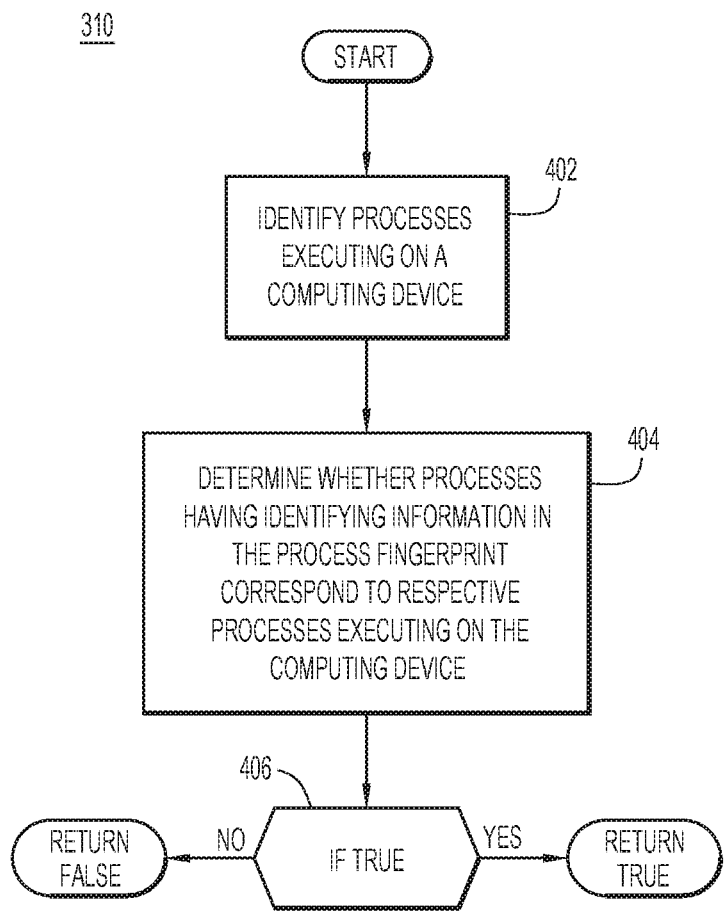
FIG. 4 is a flowchart of an example process, which shows in more detail how a determination is made regarding whether a software product is being used on a computing device according to various embodiments.

FIG. 4 is a more detailed flowchart of act 310 of FIG. 3 for determining if a software product is being used on a computing device. The process may begin by identifying processes executing on the computing device (act 402). Next, a determination may be made regarding whether the processes having identifying information in a process fingerprint correspond to respective processes executing on the computing device (act 404).

As mentioned above, in some embodiments, identifying information included in the process fingerprint regarding one or more common processes such as, for example, cmd.exe or other common processes, may be ignored during act 404 when determining whether the processes having identifying information in the process fingerprint correspond to respective processes executing on the computing device. As an alternative, some embodiments, may not store identifying information of the one or more common processes in the process fingerprint. Using this alternative approach, during act 404, a determination is made regarding whether each process having identifying information in the process fingerprint corresponds to respective process executing on the computing device.

If the determination of act 404 is true (act 406), indicating that the software product is being used on the computing device, then the process may return a true value (e.g., to a calling program such as, for example, the calling program at act 310). Otherwise, the process may return a false value (e.g., to the calling program).

Figure 5:
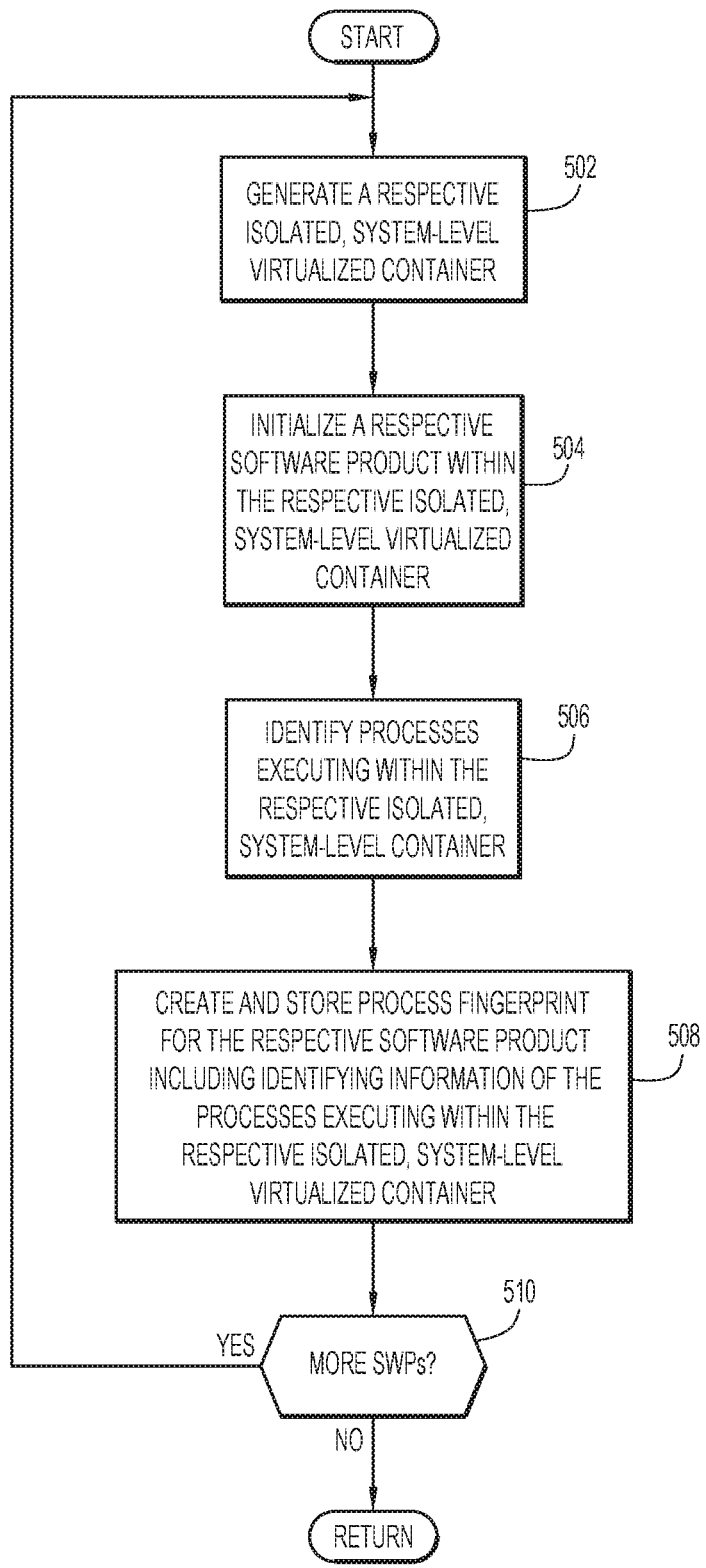
FIG. 5 is a flowchart of an example process, according to various embodiments, for creating a library of process fingerprints, each of which is associated with a respective software product.

FIG. 5 is a flowchart of an example process for creating and storing process fingerprints for respective software products. The process may begin with a computing device such as, for example, computing device 104, generating a respective isolated, system-level virtualized or other container (act 502) and initializing a respective software product within the respective isolated system-level virtualized container (act 504) by using Docker®, another software development platform, another software product, or another method. Computing device 104 then may identify processes executing within the respective isolated system-level container (act 506). Computing device 104 then may create a process fingerprint for the respective software product, including identifying information of the processes executing within the respective isolated, system-level virtualized container, and may store the process fingerprint in a repository (act 508).

In some embodiments, computing device 104 may not include identifying information of one or more common processes such as, for example, cmd.exe or other common processes, in the created process fingerprint, (act 508).

Computing device 104 may then determine whether another process fingerprint is to be created and stored for another software product (act 510). If another process fingerprint is to be created and stored for another software product, then acts 502-510 may be performed again (act 510), thereby creating a library of process fingerprints for multiple software products. If, at act 510, computing device 104 determines that no additional process fingerprints are to be created for any additional software products, then the process may be completed.

In some embodiments, the repository may include a database such as, for example, a relational database or other type of database.

Figure 6:
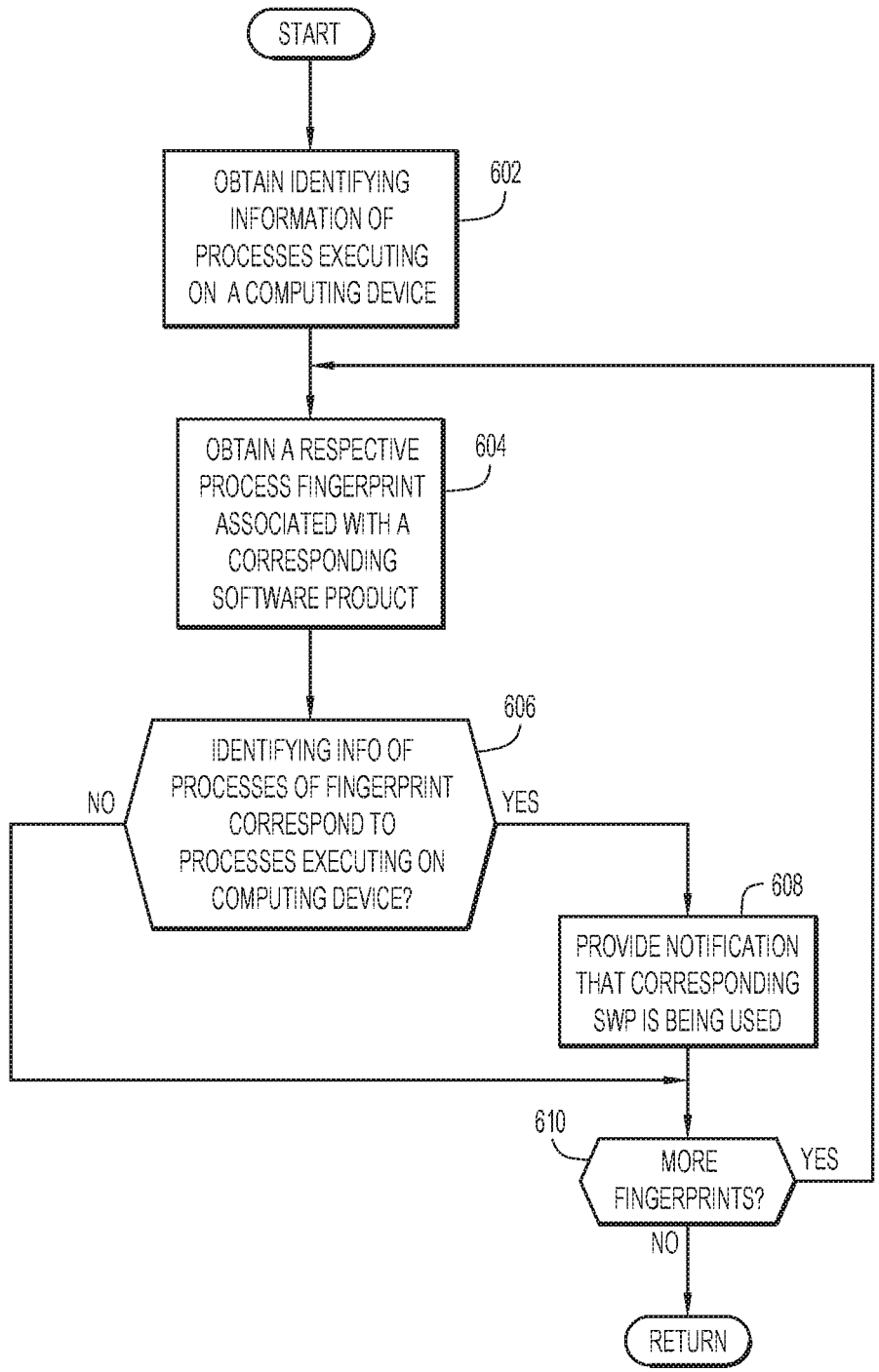
FIG. 6 is a flowchart of an example process, according to various embodiments, in which executing processes identified on a computing device are compared with process fingerprints, each of which is associated with a different software product, to determine which of the different software products are being used on the computing device.

FIG. 6 is a flowchart of an example process for comparing processes executing on a computing device with identifying information included in respective process fingerprints to determine whether the computing device uses software products associated with the respective process fingerprints. The process may be executed on a computing device of interest, which may be using one or more respective software products, or the process may be executed on a computing device that is remotely located from the computing device of interest, but is connected to the computing device of interest via one or more networks.

The process may begin by obtaining identifying information of processes executing on a computing device (act 602). The identifying information may include process identifying information such as for example, a unique process name or a unique process number. A respective process fingerprint associated with a corresponding software product then may be obtained from a repository that may include a library of process fingerprints for respective software products (act 604). Next, a determination may be made regarding whether identifying information of processes included in the respective process fingerprint correspond to a respective process executing on the computing device (act 606).

In an embodiment in which only identifying information of non-common processes are included in process fingerprints, the determination of act 606 may include determining whether identifying information of each process included in the process fingerprint corresponds to a respective process executing on the computing device. In other embodiments in which the identifying information included in the process fingerprints may include identifying information of common processes as well as non-common processes, act 606 may ignore the identifying information of common processes included in process fingerprints.

If the identifying information of the processes included in the respective process fingerprint corresponds to respective processes executing on the computing device, then a notification may be provided indicating that the corresponding software product is being used (act 608). The notification may be provided via any of the methods previously described for providing a notification or via another method. In addition to the providing of the notification, one or more other actions may be performed including, but not limited to, uninstalling/removing the software product, stopping licensing of the software product, and updating the software product.

After performing act 608 or after performing act 606 and determining that the software product is not being used on the computing device, a determination may be made regarding whether an additional process fingerprint for another software product is to be compared with the processes executing on the computing device (act 610). If so then acts 604-606 may again be repeated until there are no additional process fingerprints to be compared with the processes executing on the computing device, at which point the process is completed.

It will be appreciated that the embodiments described above and illustrated in the drawings represent only a few of the many ways of implementing embodiments for determining whether a software product is being used on a computing device.

The environment of the present invention embodiments may include any number of computer or other processing systems (e.g., client or end-user systems, server systems, etc.) and databases or other repositories arranged in any desired fashion, where the present invention embodiments may be applied to a number of desired types of computing environment (e.g., cloud computing, client-server, network computing, mainframe, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to a computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for determining usage of a software product, the method comprising:
   initializing the software product within an isolated, system-level virtualized container;
   executing the software product within the virtualized container, wherein only processes associated with the software product are executed within the virtualized container;
   identifying the processes executing within the virtualized container, wherein the processes include common processes comprising operating system processes and non-common processes that are specific to the software product, and wherein the common processes are determined based on a comparison to a predefined list of common processes;
   creating a process fingerprint for the software product, the process fingerprint including information identifying the common and non-common processes executing within the virtualized container;
   obtaining information identifying common and non-common processes executing on a computing device and comparing the obtained information to the process fingerprint;
   determining that the software product is not used on the computing device in response to the comparing indicating that at least one of the non-common processes included in the process fingerprint is not executing on the computing device; and
   sending an electronic message over a network to a user indicating the software product is not used on the computing device.

2. The computer-implemented method of claim 1, further comprising:
   initializing a respective software product within each of a plurality of virtualized containers;
   identifying non-common processes executing within the each of the plurality of virtualized containers;
   creating a plurality of process fingerprints, each of the plurality of process fingerprints being associated with the respective software product initialized within a corresponding one of the plurality of virtualized containers and including identifying information of each of the non-common processes executing within the corresponding one of the plurality of virtualized containers; and
   storing the plurality of process fingerprints in a repository.

3. The computer-implemented method of claim 2, further comprising:
   identifying non-common processes executing on a computing system;
   comparing each of the identified non-common processes executing on the computing system to identifying information included in one or more of the plurality of process fingerprints; and
   determining that a particular software product is used on the computing system when each of the non-common processes identified by the identifying information of one of the one or more process fingerprints, which is associated with the particular software product, are included among the identified non-common processes executing on the computing system.

4. The computer-implemented method of claim 3, further comprising:
   notifying a user that the particular software product is being used on the computing system.

5. A system for determining usage of a software product, the system comprising:
   at least one processor; and
   at least one memory, each of which is connected to a processor of the at least one processor, wherein the at least one processor is configured to perform:
   initializing the software product within an isolated, system-level virtualized container;
   executing the software product within the virtualized container, wherein only processes associated with the software product are executed within the virtualized container;
   identifying the processes executing within the virtualized container, wherein the processes include common processes comprising operating system processes and non-common processes that are specific to the software product, and wherein the common processes are determined based on a comparison to a predefined list of common processes;

creating a process fingerprint for the software product, the process fingerprint including information identifying the common and non-common processes executing within the virtualized container;

obtaining information identifying common and non-common processes executing on a computing device and comparing the obtained information to the process fingerprint;

determining that the software product is not used on the computing device in response to the comparing indicating that at least one of the non-common processes included in the process fingerprint is not executing on the computing device; and sending an electronic message over a network to a user indicating the software product is not used on the computing device.

6. The system of claim 5, wherein the at least one processor is further configured to perform:

initializing a respective software product within each of a plurality of virtualized containers;

identifying non-common processes executing within the each of the plurality of virtualized containers;

creating a plurality of process fingerprints, each of the plurality of process fingerprints being associated with the respective software product initiated within a corresponding one of the plurality of virtualized containers and including identifying information of each of the non-common processes executing within the corresponding one of the plurality of virtualized containers; and storing the plurality of process fingerprints in a repository.

7. The system of claim 6, wherein the at least one processor is further configured to perform:

identifying non-common processes executing on a computing system;

comparing each of the identified non-common processes executing on the computing system to identifying information included in one or more of the plurality of process fingerprints; and determining that a particular software product is used on the computing system when each of the non-common processes identified by the identifying information of one of the one or more process fingerprints, which is associated with the particular software product, is included among the identified non-common processes executing on the computing system.

8. The system of claim 7, wherein the at least one processor is further configured to perform:

notifying a user that the particular software product is being used on the computing system.

9. A computer program product for determining usage of a software product, the computer program product comprising at least one computer readable storage medium having computer readable program code embodied therewith for execution on one or more processors, the computer readable program code being configured to be executed by the one or more processors to perform:

initializing the software product within an isolated, system-level virtualized container;

executing the software product within the virtualized container, wherein only processes associated with the software product are executed within the virtualized container;

identifying the processes executing within the virtualized container, wherein the processes include common processes comprising operating system processes and non-common processes that are specific to the software product, and wherein the common processes are determined based on a comparison to a predefined list of common processes;

creating a process fingerprint for the software product, the process fingerprint including information identifying the common and non-common processes executing within the virtualized container;

obtaining information identifying common and non-common processes executing on a computing device and comparing the obtained information to the process fingerprint;

determining that the software product is not used on the computing device in response to the comparing indicating that at least one of the non-common processes included in the process fingerprint is not executing on the computing device; and sending an electronic message over a network to a user indicating the software product is not used on the computing device.

10. The computer program product of claim 9, wherein the computer readable program code further configures the one or more processors to perform:

initializing a respective software product within each of a plurality of isolated, system-level virtualized containers;

identifying non-common processes executing within the each of the plurality of virtualized containers;

creating a plurality of process fingerprints, each of the plurality of process fingerprints being associated with the respective software product initiated within a corresponding one of the plurality of virtualized containers and including identifying information of each of the non-common processes executing within the corresponding one of the plurality of virtualized containers; and storing the plurality of process fingerprints in a repository.

11. The computer program product of claim 10, wherein the computer readable program code further configures at least one of the one or more processors to perform:

identifying non-common processes executing on a computing system;

comparing each of the identified non-common processes executing on the computing system to identifying information included in one or more of the plurality of process fingerprints; and determining that a particular software product is used on the computing system when each of the non-common processes identified by the identifying information of one of the one or more process fingerprints, which is associated with the particular software product, is included among the identified non-common processes executing on the computing system.

12. The computer program product of claim 11, wherein the computer readable program code further configures the at least one of the one or more processors to perform:

notifying a user that the particular software product is being used on the computing system.

* * * * *